May 2, 1950            O. ALVISTUR            2,505,821
VEHICLE WHEEL
Filed Dec. 26, 1947                          2 Sheets-Sheet 1
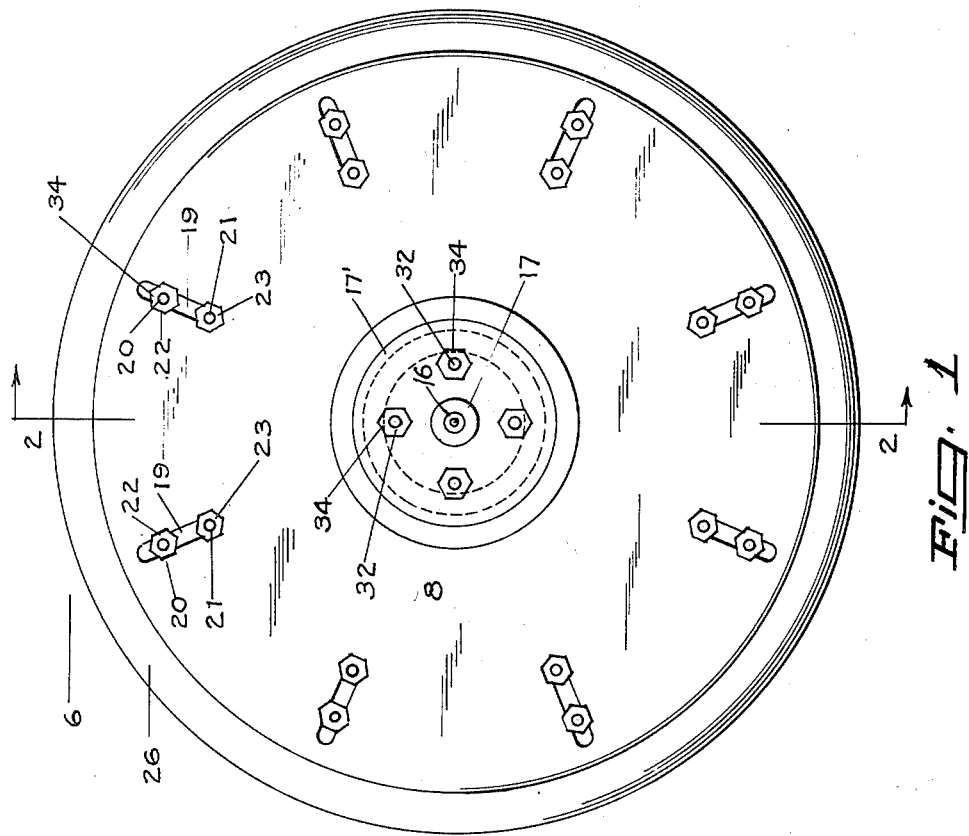
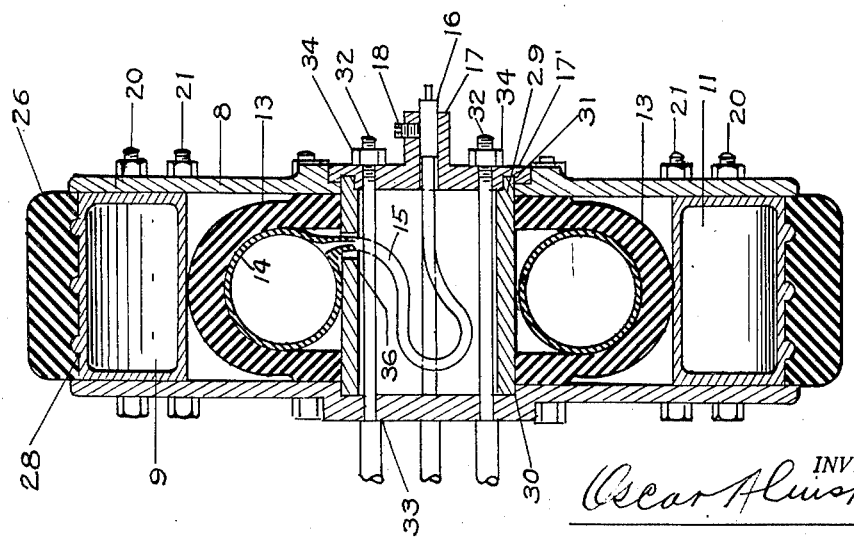

May 2, 1950     O. ALVISTUR     2,505,821
VEHICLE WHEEL
Filed Dec. 26, 1947     2 Sheets-Sheet 2
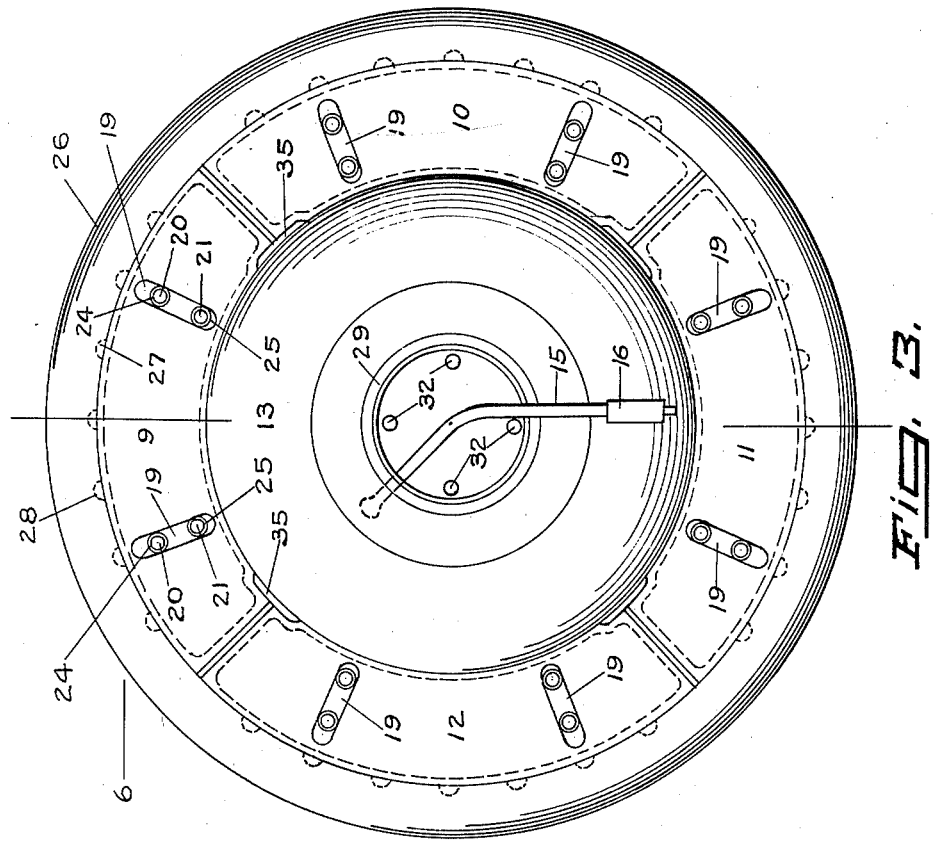
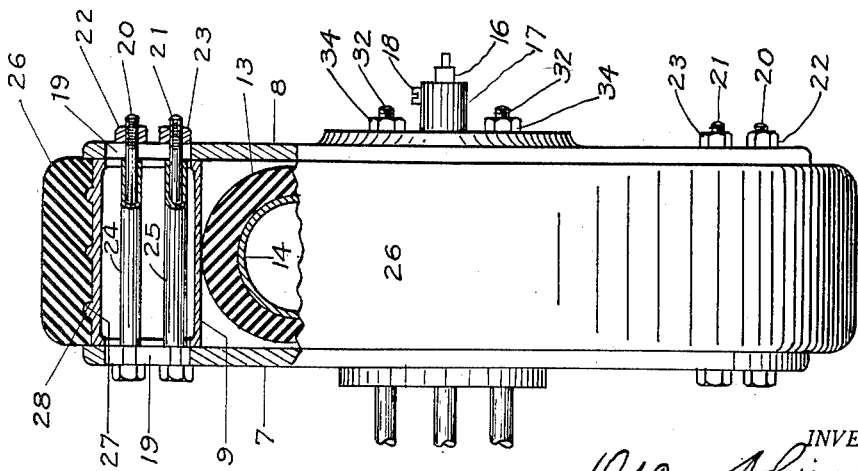
INVENTOR.
Oscar Alvistur Patented May 2, 1950

2,505,821

UNITED STATES PATENT OFFICE 2,505,821

VEHICLE WHEEL

Oscar Alvistur, San Francisco, Calif.

Application December 26, 1947, Serial No. 793,901

5 Claims. (Cl. 152—65)

This invention relates to a new and specially constructed wheel for use on automobiles, trucks, tractors, airplanes, army tanks and the like, and particularly relates to a wheel that is constructed to retain a pneumatic tube and other elements necessary to provide a vehicle wheel with the required resiliency in a manner that will positively prevent the tube from being punctured.

Another object of the present invention is to provide a tire and tube within the wheel and to position a plurality of arc shaped members around the outer periphery thereof to protect the tire and the tube therein.

Another object of the present invention is the provision provided for removing the tube from the tire through the center of the wheel.

A further object of the present invention is the provision of a removable sleeve for supporting the tube and tire within the wheel.

A still further object of the present invention is the provision of a tread in the form of a band made of rubber or other resilient or flexible material and to secure the said tread to the arc shaped members of the wheel by a plurality of circular button-like projections provided on the said arc shaped members and extending into the inner periphery of the said tread.

A still further object of the present invention is the provision of a vehicle wheel of the character described that is durable, simple in construction, positive in operation, economical to manufacture and highly efficient and serviceable in use.

The invention further consists in the particular combination, construction and association of the different parts such as described in the following specification and possesses various other objects and features of advantage, some of which, with the foregoing, will be made manifest, in the following description of the preferred form of the invention that is illustrated in the drawings accompanying and forming part of the specification.

It is to be understood that it is not intended to limit the invention to the embodiment shown by said drawings and description, as variations may be adapted within the principle of the invention as set forth in the claims.

In the accompanying drawings, wherein for the purpose of illustration like numerals designate like parts throughout the same:

Fig. 1 is a front elevational face view of one type of wheel embodying the invention, Fig. 2 is a vertical sectional view of the wheel taken on line 2—2 of Fig. 1, looking in direction of the arrows, Fig. 3 is a front elevational view of the wheel with the cover plate removed illustrating to advantage the tire within the wheel, the series of segments surrounding the tire and the tread connected to the said segments, and Fig. 4 is an end view of the wheel shown partly in elevation and partly in section, the section portion being taken through one of the slots in the cover plate, illustrating to advantage the bolts and revolvable spacer bushings provided for retaining the complete assembly together, for the purpose of clarity, some of the bolt heads and nuts not being shown in the elevation.

Referring in detail to the drawings and to the numerals thereof, the numeral 6 designates the wheel as a whole, which wheel embodies in its construction, along with other elements, a pair of side cover plates 7 and 8 and a series of arc shaped segments 9, 10, 11 and 12. Any suitable number of the said segments may be employed. A small pneumatic tire 13, preferably of the airplane landing type, is provided within the wheel and supports the said segments as illustrated to advantage in Figs. 2 and 3. A conventional pneumatic tube 14 is positioned within the said tire, the said tube including an inflating hose 15 and a conventional tire valve member 16 as disclosed to advantage in Fig. 2, the said valve member extending through the sleeve 17 provided on the outer cover's disk 17' and is removably secured thereto by the set screw 18. A plurality of suitable radially extending slots 19 are provided through the said cover plates 7 and 8 for accommodating the bolts 20 and 21, which bolts carry the nuts 22 and 23, respectively, as shown in Figs. 1 and 4. Suitable roller sleeves 24 and 25, respectively, are provided on the said bolts and extend through the said slots as shown to advantage in Figs. 3 and 4. The tire tread comprises a substantially heavy band 26 intermittently recessed as at 27 for receiving the button-like projections 28 provided on the said arc-shaped segments 9, 10, 11 and 12, whereby the said tread is keyed to the said members. A suitable removable cylindrical sleeve 29 supports the tire 13 in the wheel and in return is supported in the inner cover plate 7 and the outer cover's disk 17' as shown at 30 and 31, respectively, in Fig. 2. Suitable bolts or studs 32 shouldered as at 33 and carrying nuts 34, retain the disk 17', in the cover 8, and also secure the wheel to the axle of the vehicle or to a suitable member secured to the said axle. Flexible coverings 35, such as leather, are provided over the joints formed by the segments to reduce friction against the tire 13, as shown to advantage in Fig. 3. The said sleeve 29 is apertured as at 36 for accommodating the hose 15. Although the numerals designating the bolts 20 and 21 and rollers 24 and 25 are shown in the arc section 9 in Figs. 1 and 3, it is obvious that the bolts, rollers and other construction is the same in the other various sections forming the wheel.

From the foregoing description taken in conjunction with the accompanying drawings, it will be obvious that the present invention possesses many distinct advantages over vehicle wheels of the character described. The supporting of the entire structure on a reduced pneumatic tire and the provision of means for enabling the tire tube to be removed through the central portion of the wheel constitutes an improvement in wheel structures, which, with the other constructions provided, produces an entirely new and improved vehicle wheel.

It is to be understood that the drawings and description of the present invention are to be taken as a preferred example of the same and that changes, relative to the size, shape, and arrangement of parts, may be resorted to without departing from the spirit of the invention or the scope of the subjoined claims.

Having thus described my invention, I claim:

1. A vehicle wheel of the character described, comprising a pneumatic tire, a plurality of arc shaped sections surrounding the same, a tread provided on the outer peripheries of the said sections, a reinforcing medium horizontally extending through the center of the tire for radially supporting the same and means including a pair of oppositely disposed side plates for retaining the said sections and tire together.

2. A vehicle wheel of the character described, comprising a pneumatic tire, a plurality of hollow rigid arc shaped sections surrounding the same, a tread surrounding the said sections and secured thereto, a supporting medium horizontally extending through the center of the tire for radially supporting the same, a pair of oppositely disposed plates positioned against the sides of the said tire and hollow sections means for securing the said supporting medium to the said plates, a plurality of radially extending slots provided through the side walls of the said hollow sections, a plurality of radially extending slots provided through the said plates and coinciding with the said slots in the said hollow sections and means including a plurality of bolts extending through the said slots for retaining the said parts forming the wheel together in a manner enabling the said arc shaped hollow sections to be radially movable within the wheel.

3. A vehicle wheel of the character described, comprising a pneumatic tire including a pneumatic tube positioned therein, a plurality of rigid arc shaped sections surrounding the tire, a substantially flexible tread surrounding the arc shaped sections and secured thereto, a pair of oppositely disposed side plates positioned against the sides of the said tire and side walls of the said arc shaped sections, a hollow cylindrical member horizontally extending from one of the side plates through the center of the tire to the opposite side plate, the said cylindrical member being capable of centrally supporting the said pneumatic tire and tube, means for retaining the parts forming the wheel together in a manner enabling the said arc shaped sections to be radially movable within the wheel and means for removing the said pneumatic tube through the central portion of the wheel.

4. A vehicle wheel of the character described, comprising a pneumatic tire, a pneumatic tube positioned therein, a plurality of rigid arc shaped sections surrounding the tire, a substantially flexible tread surrounding the arc shaped sections, a plurality of projections extending from the said arc shaped sections into the body of the tread for removably retaining the tread to the arc shaped sections, two oppositely disposed plates positioned against the sides of the said tire and side walls of the said arc shaped sections, a hollow cylindrical member horizontally extending from one of the side plates through the center of the tire to the opposite side plate, means in the side plates for supporting the said cylindrical member, whereby the tire is supported, a plurality of radially extending slots through the said side plates and arc shaped sections, a plurality of bolts extending through the said slots, a plurality of bushings revolvably mounted on the said bolts and means for removably securing the said cylindrical member within the wheel, whereby the pneumatic tube is removable through the central portion of the wheel.

5. In combination with a pneumatic tire, a vehicle wheel of the character described, comprising a plurality of arc-shaped sections adapted to be positioned on and around the periphery of the tire, a tread provided on the outer surfaces of the said sections, a pair of oppositely disposed side plates for laterally supporting the tire and said arc shaped sections, means for removably securing the side plates one to the other, an opening in one of the side plates, a cover positioned over said opening, a sleeve horizontally extending through the center of the wheel from one side plate to the said cover positioned on the opposite side plate, the said sleeve being adapted to radially support the tire and means for removably securing the sleeve to the said cover, whereby the sleeve is capable of being removed with the cover.

OSCAR ALVISTUR.

REFERENCES CITED

The following references are of record in the file of this patent:

UNITED STATES PATENTS

| Number | Name | Date |
|---|---|---|
| 986,948 | Shanklin | Mar. 14, 1911 |
| 1,199,562 | Jordan | Sept. 26, 1916 |
| 1,271,957 | Sprengnether | July 9, 1918 |